No. 794,508. PATENTED JULY 11, 1905.
W. G. KIRCHHOFF.
FARE REGISTER.
APPLICATION FILED NOV. 29, 1901.

Attest
Wm H Scott
George Bakewell

Inventor:
William G. Kirchhoff,
by Bakewell & Cornwall
attys.

No. 794,508. PATENTED JULY 11, 1905.
W. G. KIRCHHOFF.
FARE REGISTER.
APPLICATION FILED NOV. 29, 1901.

Attest:
Wm H Scott
George Bakewell

Inventor:
William G. Kirchhoff,
by Bakewell & Cornwell
Attys.

No. 794,508. PATENTED JULY 11, 1905.
W. G. KIRCHHOFF.
FARE REGISTER.
APPLICATION FILED NOV. 29, 1901.

Attest:

Inventor:
William G. Kirchhoff,
by Bakewell Cornwall
Attys.

No. 794,508. PATENTED JULY 11, 1905.
W. G. KIRCHHOFF.
FARE REGISTER.
APPLICATION FILED NOV. 29, 1901.

Attest:
Jno. H. Scott
George Bakewell

Inventor:
William G. Kirchhoff,
by Bakewell Cornwall
Attys.

No. 794,508. Patented July 11, 1905.

UNITED STATES PATENT OFFICE.

WILLIAM G. KIRCHHOFF, OF ST. LOUIS, MISSOURI, ASSIGNOR, BY MESNE ASSIGNMENTS, TO SECURITY REGISTER COMPANY, OF ST. LOUIS, MISSOURI, A CORPORATION OF MISSOURI.

FARE-REGISTER.

SPECIFICATION forming part of Letters Patent No. 794,508, dated July 11, 1905.

Application filed November 29, 1901. Serial No. 84,119.

*To all whom it may concern:*

Be it known that I, WILLIAM G. KIRCHHOFF, a citizen of the United States, residing at the city of St. Louis, State of Missouri, have invented a certain new and useful Improvement in Fare-Registers, of which the following is a full, clear, and exact description, such as will enable others skilled in the art to which it appertains to make and use the same, reference being had to the accompanying drawings, forming part of this specification, in which—

This invention relates to a new and useful improvement in recording fare-registers, the object being to provide a register of the character described for use in connection with railway rolling-stock, such as street-cars, for registering fares collected by the conductor, the conductor operating the register upon receiving a fare from a passenger. The fares collected by the conductor may be in the form of cash fares or other fares, such as transfers, &c.

My improved register is designed to be manipulated in different ways to register different classes of fares and to indicate on one dial by means of separate indicator-hands the number of fares of each class registered for each trip.

In addition to the trip-register mechanism a totalizer is provided for each class of fares, and this totalizer is designed to record the fares registered on strips of paper, one of which, designated as the "company's strip," is arranged in the machine and inaccessible to the conductor, while the other strip, known as the "conductor's strip," may be inserted and removed at will. However, with regard to this conductor's strip an important feature of my invention resides in a compulsory impression mechanism, which records the condition of the register upon the conductor's strip, as well as on the company's strip, at each insertion or removal of a conductor's strip. In this manner a conductor in turning in his strips to the company is responsible for fares recorded thereon, and as each conductor is provided with strips it follows that the conductors are individually responsible to the company only for fares registered as recorded on his strips. This is important, as in most systems conductors are called upon to make a certain number of trips in a specified time, after which they are relieved from duty in order to eat a meal, &c., and the car is turned over to another conductor, known as a "relief man." As the regular conductor leaves the car he takes his strip with him and before being able to remove the strip must make a compulsory impression on his strip, so that the condition of the register is recorded thereon at the time the car is turned over to the relief man. Before the register can be operated the relief man must insert his strip, and in so doing is compelled to record the condition of the register thereon, which should correspond with the condition of the register as recorded on the strip of the regular conductor previously removed. In this manner the regular conductor is responsible only for the fares recorded on his strip, while the relief man is responsible only for fares registered and recorded on his strip.

My invention consists in the construction, arrangement, and combination of the several parts, all as will hereinafter be described and afterward pointed out in claims.

In the drawings I have illustrated but one of several forms of mechanisms which are capable of use in carrying out my invention, and with respect to the devices illustrated I will say that some of them are shown and described in United States Letters Patent No. 683,471, granted to me October 1, 1901. I do not herein claim those old devices, except as they are combined and arranged with each other in a novel way to produce new results, as hereinafter described, and pointed out in the claims.

In the drawings, 1 indicates what I will term the "back plate," which is provided with a marginal flange 2, to which flange is secured a cylindrical casing 3. This casing supports a dial 4, over which is arranged a protecting-glass 5, said glass being held in position in an appropriate manner.

Figures 1, 2, 3, 4:
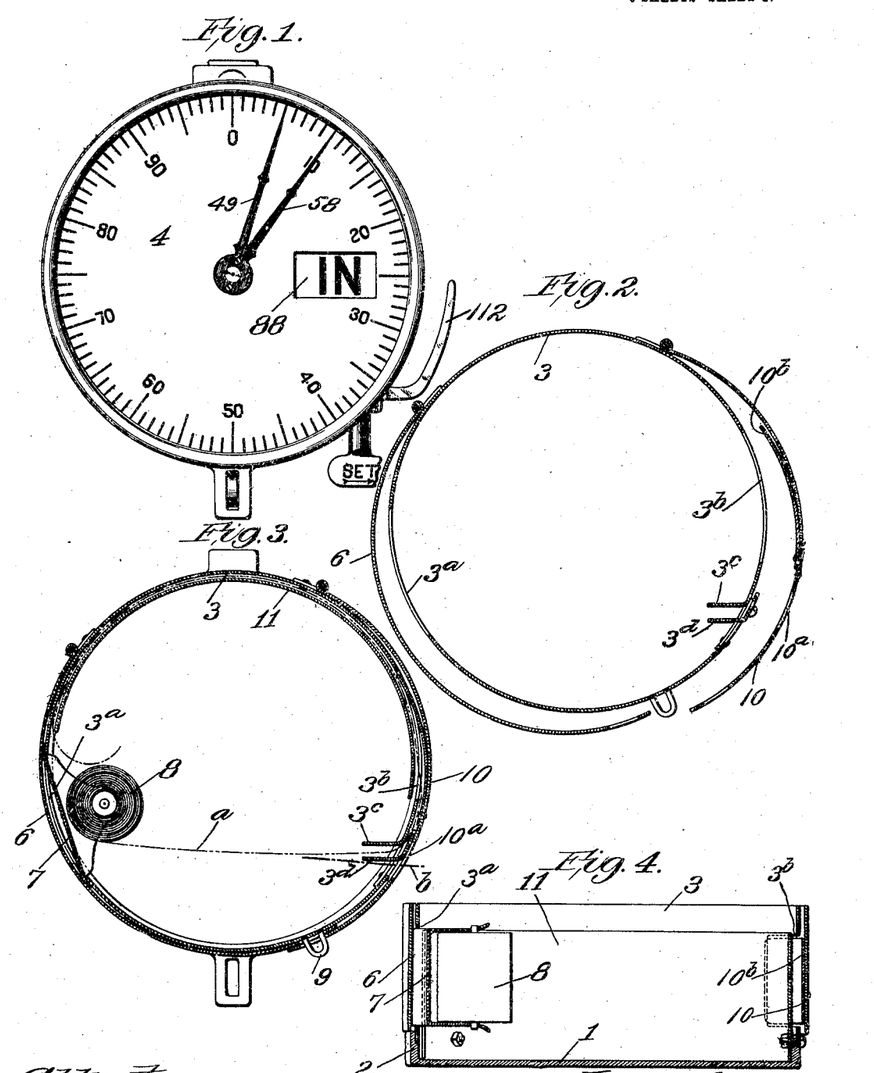
Figure 1 is a plan view of my improved fare-register.
Fig. 2 is a detail sectional view of the casing, showing the hinged panels partially open.
Fig. 3 is a similar view showing the hinged panels closed.
Fig. 4 is a vertical sectional view through the casing.

Referring now to Fig. 3, it will be observed that the casing 3 is provided with openings $3^a$ and $3^b$ and that at the overlapping ends of said casing are inwardly-extending tongues $3^c$ and $3^d$. Hinged to the casing 3 is a panel 6, which carries a support in the form of a plate 7 for a roll or spool of paper 8. The strip of paper coming from this roll is what is known as the "company's strip" and passes between the tongues $3^c$ and $3^d$, as will hereinafter be more particularly described. The free end of this hinged panel 6 passes over a staple 9, which staple is designed to receive a lock of suitable design to hold said panel and a panel 10 in position, said lock also preventing said panels being opened by any one other than the person holding a key to the lock—usually an authorized employee of the company. The panel 10 referred to is provided with an opening $10^a$, through which the conductor's strip may be inserted and removed, said conductor's strip being indicated at $b$ and being designed to pass under the tongue $3^d$, as shown in Fig. 3. Panel 10 is also provided with a tongue $10^b$, which extends through the opening $3^b$ and guides the end of the company's strip (indicated at $a$) inside of the casing 3, or rather in the space between said casing and a guard-shield 11, arranged, as shown in Fig. 3, to form a housing and guide for the company's strip. It will be observed that this guard-shield permits the company's strip to issue at a point above the roll 8, at which point the company's strip may fold without interfering with the mechanism, and in this way while a number of impressions is made on the company's strip in a day a considerable length of the company's strip may be used without necessitating its removal. In this respect the register can be operated a much longer time than is possible with the construction shown in my former patent, where but a limited length of company's strip could be housed.

Figure 9:
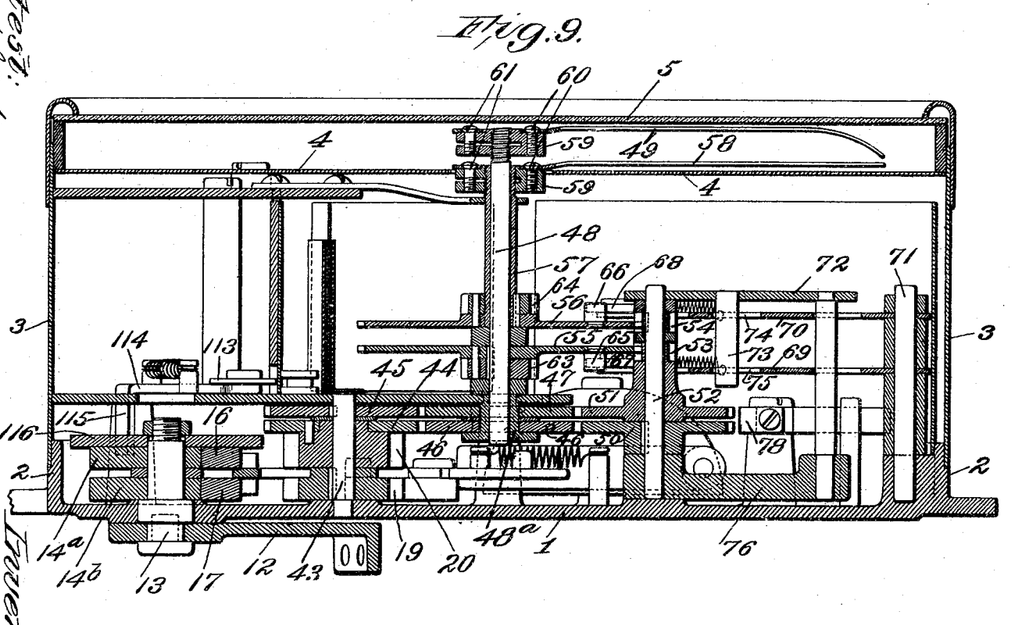
Fig. 9 is a vertical sectional view through the register on line 9 9, Fig. 5.
Figures 10, 11:
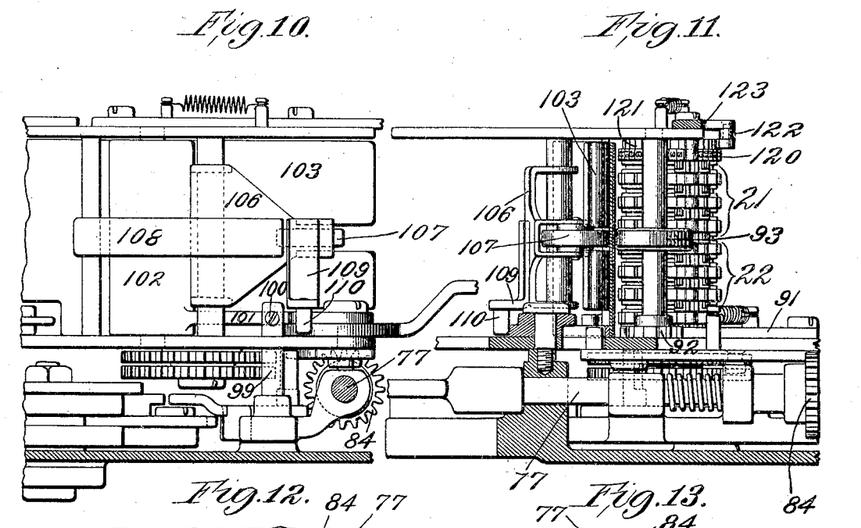
Fig. 10 is a detail sectional view on line 10 10, Fig. 5.
Fig. 11 is a detail sectional view on line 11 11, Fig. 5.

Referring now to Fig. 9, 12 indicates a rock-arm mounted upon a rock-shaft 13, to which arm 12 are attached the operating cords or levers designed to be manipulated by the conductor. When this arm 12 is rocked in one direction, "cash" fares are registered, and when said arm is rocked in the opposite direction "tickets" are registered. The shaft 13, as shown in Figs. 6, 7, 8, and 9, carries a rocking block 14, said block being in the form of a double cam, the working faces of said cam being designed to coöperate, respectively, with independently-operable levers. The levers with which the working faces of this double cam coöperate are indicated at 15 and 16, both of which carry racks 17 and 18, meshing with ratchet-wheels 19 and 20, respectively. These parts are so arranged that when the rock-arm 12 is moved to the left the cam, which I will designate as $14^a$, will operate the lever 15 and rotate the ratchet 19 the distance of one tooth, the cam $14^b$ in this operation permitting the lever 16 to remain stationary. When the rock-arm 12 is moved to the right, lever 15 remains stationary and the lever 16 is moved to rotate ratchet-wheel 20 the distance of one tooth. These ratchet-wheels 19 and 20 are connected to the units-wheels, respectively, of two totalizers 21 and 22, each totalizer, as shown in Fig. 11, consisting of a bank of wheels carrying printing-type on their peripheries. I have not deemed it necessary to illustrate in detail the manner in which these driving-ratchets are connected to their respective totalizers, as this feature is unimportant, besides being well known. Furthermore, I will state that the manner of actuating the wheels of higher order in the totalizers from the wheels of lower order may be such as is commonly employed in "accumulating" or "adding" mechanism, as they are called.

23 indicates a bell-crank lever having one member connected to a spring 24 and having pins or projections 25 on the other of its members, which bear upon the levers 15 and 16, respectively, whereby said spring-pressed bell-crank lever is common to both of said levers 15 and 16, and when either is actuated the spring-pressed bell-crank lever exerts its energy to restore the same and its connected rack to a normal position.

26 and 27 indicate pawls which coöperate with the ratchets 19 and 20, respectively, for preventing a return movement of said ratchets after they or either of them have been advanced the distance of one tooth. The operation and construction of these "detaining-pawls," as they are called, are well understood. I will state, however, that I prefer to employ independently-movable pawls for each ratchet.

Figure 6:
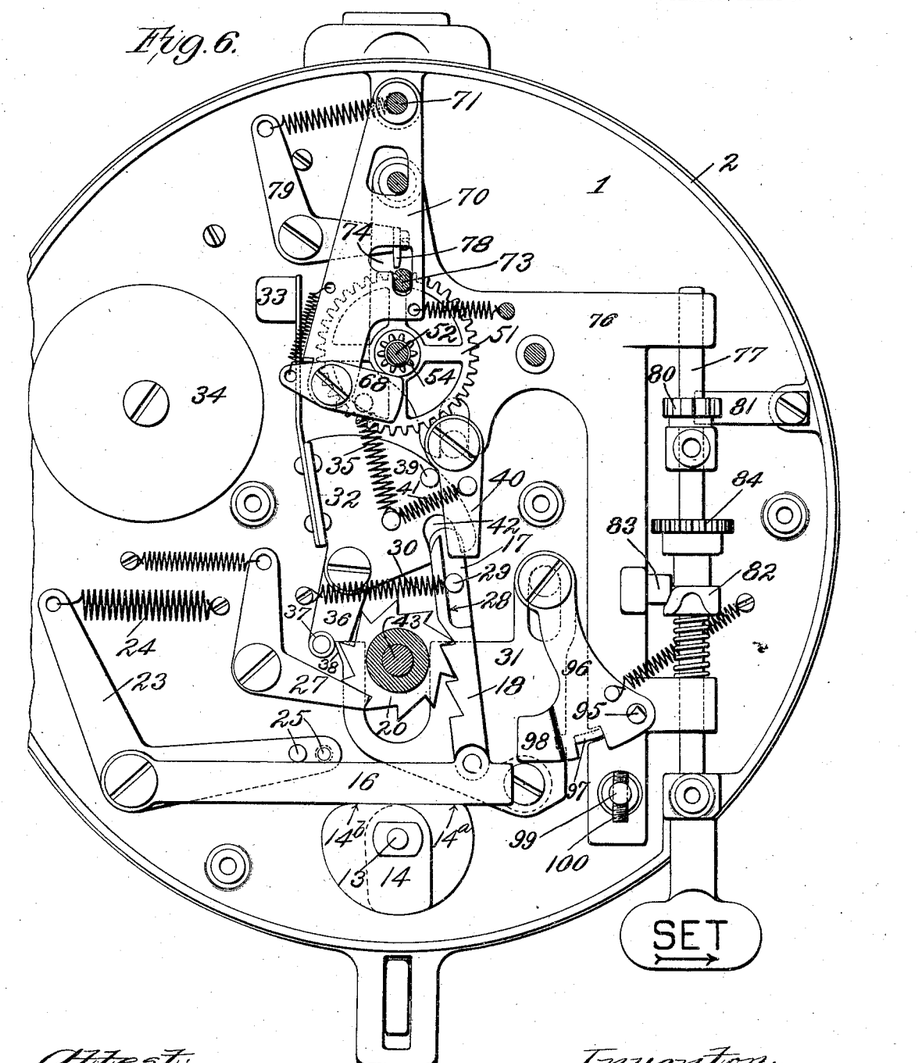
Fig. 6 is a similar view with parts of the mechanism near the dial removed to more clearly show the mechanism at the back of the machine.

Referring now to Fig. 6, it will be observed that the upper end of rack 18 is provided with a cut-away or reduced portion 28, while the rack 17 immediately therebeneath has a pin 29, to which is connected a spring 30, whereby said single spring operates to hold both of said racks yieldingly against their respective ratchets, besides permitting the independent vertical movement of either. It will be observed in this connection that when the rack 18 is actuated the upward movement thereof rotates the ratchet 20 and that the downward movement of said rack in riding over the teeth of the ratchet carries the rack 17 down until the rack 18 is permitted to drop behind the next tooth, when the spring 30 will bring both racks 17 and 18 to their home position in engagement with the teeth of their respective ratchet-wheels, and that when the rack 17 is operated the upward movement thereof rotates the ratchet-wheel 19 and the spring 30 is directed to returning the rack 17 to its home position, the rack 18 idly vibrating or remaining stationary, as the case may be, while the rack 17 rides downwardly over the teeth in its downward movement.

31 indicates a plate which is secured to and movable with the lever 15, said plate, however, having no connection with the lever 16. This plate is guided in its vertical movement by suitable recesses or slots. The bell-ringing mechanism is restored by this plate 31. Consequently whenever the lever 15 is actuated by the rock-arm 12 being pulled to the left (to register cash fares) the plate 31 is vibrated and the bell is rung; but when the rock-arm 12 is moved to the right to actuate the lever 16 (and register tickets) the plate 31 remains stationary and no audible signal is sounded.

Figures 7, 8:
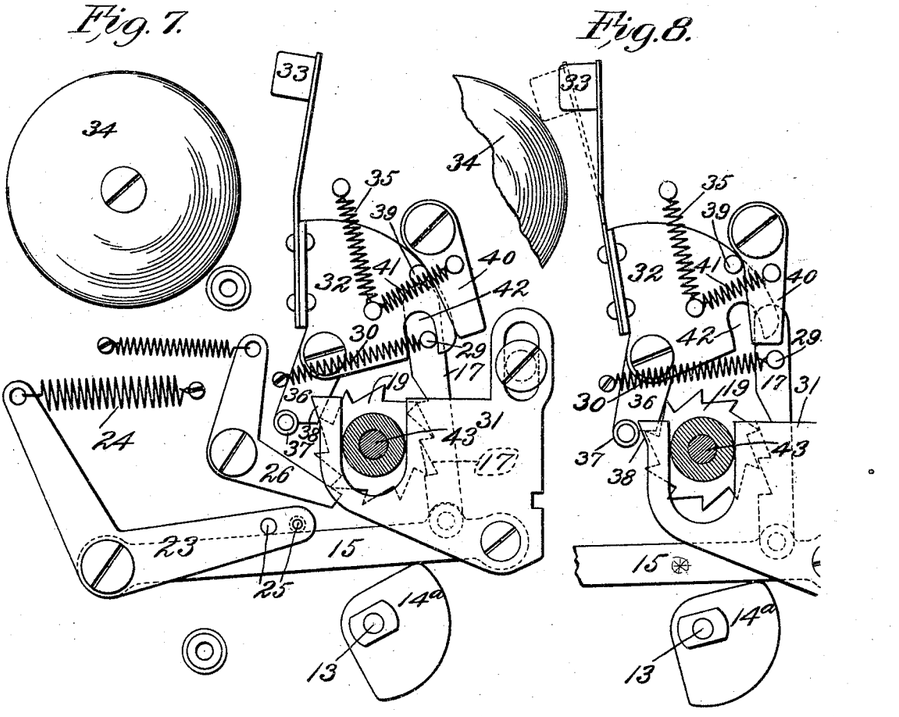
Fig. 7 is a detail elevational view showing some of the parts illustrated in Fig. 6 in a changed position.
Fig. 8 is a similar view showing said parts in a different position.

I will now assume that from the position shown in Fig. 6 the parts have been moved to the position shown in Fig. 7 by rocking the lever 12 to the left to register a cash fare. In this operation the totalizer-bank connected to the ratchet-wheel 19 is operated; but the "ticket-register," as it might be termed, is not actuated.

32 indicates a rocking plate which carries a bell-hammer 33, mounted upon a yielding support, as usual, which hammer is designed to strike the bell 34. This plate and its carried bell-hammer are forced toward the bell by a spring 35. The plate 32 is provided with a downwardly-extending shouldered projection 36, which is designed to ride over the teeth of ratchet-wheel 19, and in dropping over a tooth the spring 35 is allowed to act to throw the bell-hammer toward the bell, as shown in Fig. 8, the momentum developed in the bell-hammer in this action being sufficient to cause the hammer to strike the bell, as shown by dotted lines. The extension 36 referred to is provided with a projection 37, which is designed to coöperate with a cam-face 38 on the plate 31 in such manner that when the plate 31 is raised the cam-face 38 is out of the path of the projection 37; but when said plate 31 returns to its normal or lowermost position the cam-face 38 engages the projection 37 and rocks the plate 32 slightly so as to recover the bell-hammer and move it away from the bell, so that the bell will not be struck by the hammer when the register receives shocks or jars incident to surrounding conditions. In other words, the purpose of this recovery of the bell-hammer is to prevent accidental or unintentional striking of the bell.

To prevent the operator after registering a cash fare from again manipulating the register so as to sound the bell without registering a fare I have provided a lock which is designed to coöperate with the bell-striking mechanism, which lock becomes effective after the bell is rung and prevents the bell being struck the second time unless and until the operator fully releases the arm 12 and permits the parts to be restored to normal position. In other words, this lock insures a full release of the register before another fare of any description can be registered, and, in the event of the registration of a cash fare, before such fare can be registered and the bell rung.

39 indicates a pin or projection on the plate 32, which coöperates with the dog 40, said dog being caused to hug said pin at all times by a spring 41. When the bell-hammer plate is rocked by the ratchet-wheel 19 to store up power in its impelling-spring 35, the dog 40 is moved to one side out of the path of the rising pin 29 on the rack 17, as shown in Fig. 7. When the bell-hammer is tripped, or rather falls over a ratchet-tooth, the pin 39 permits the dog 40 to strike against the pin 29, and as the lever 15 moves downwardly to recover the rack 17 pin 29 is brought below the dog 40, as shown in Fig. 8, permitting said dog to swing inwardly over said pin. As the rack 17 is now held in an outward position by reason of the apex engagement of its teeth, it follows that any attempt to vibrate the plate 32 and ring the bell without registering a fare, as by a sudden movement, will be frustrated by the pin 29 striking the lower end of the dog 40. When the arm 12 is released and the lever 15 permitted to return home, the rack will fall in position in mesh with the teeth of wheel 19 and swing inwardly, as shown in Fig. 6, but not far enough to escape the dog 40. The dog 40 will remain in the path of pin 29 until the plate 32 is rocked to move the dog to one side, as shown in Fig. 7. In this downward movement of the plate 31, to which is connected the rack 17, the cam 38 engages the projection 37 and recovers the bell-hammer plate by moving the bell-hammer away from the bell. To insure the positive engagement of the teeth of rack 17 with its ratchet-wheel 19, the plate 32 is provided with a slot 42, against the outer wall of which the pin 29 travels in the upward movement of the rack, as shown in Fig. 7. In this figure it must be remembered that plate 32, or rather the edge of said plate, in which is located the slot 42, is traveling downwardly, while the rack 17 is traveling upwardly, so that the rack is held in positive engagement with its ratchet-wheel until the shouldered projection 36 drops over a tooth of the ratchet-wheel, permitting the plate 32 to swing to the position shown in Fig. 8, wherein the wall of the notch 42 passes out of engagement with the pin 29 and permits the downward movement of the rack in riding over the teeth of ratchet-wheel 19 in its return.

I have before stated that the ratchets 19 and 20 are independently operable, and, referring to Fig. 9, it will be observed that the ratchet 19 is keyed to a shaft 43, to the opposite end of which shaft is also keyed a gear 45, while the ratchet 20 has conjoined to it a gear 44, said ratchet and its conjoined gear being loosely mounted on the shaft 43. These gears 44 and 45 mesh, respectively, with gears 46 and 47, loosely mounted in a fixed stud 48ª, said stud also forming a bearing-face for a shaft 48, said shaft carrying at its outer end a hand 49. Gears 46 and 47 mesh with gears 50 and 51, the former of which is keyed to a shaft 52, to which shaft is also keyed a pinion 54, while the latter gear 51 has conjoined to it a pinion 53, said gear and its conjoined pinion being loosely mounted on the shaft 52. Pinions 53 and 54 mesh with gears 55 and 56, the former of which is keyed to the shaft 48, while the latter is keyed to a sleeve 57, loosely mounted on the shaft 48, said sleeve carrying at its outer end a hand 58. The hands 49 and 58 are each formed with an eye in its inner end for receiving a projection on a collar 59. The hands are secured in position on their respective collars by means of screws 60, and the collars are threaded to receive either the shaft 48 or the sleeve 57, as the case may be. After threading the collars a saw-kerf is made to intersect the threaded opening and to make one side of the collar yielding to an extent, whereby the hand carried by the collar may be adjusted to its proper position. A screw 61 is turned to spring one side of the collar and lock the same on its shaft or sleeve. This screw 61 also passes through the eye of the hand and serves to hold the hand in position on the collar.

The dial-hands and associate mechanism are each restored to zero position by means of spring-pressed segments 62, there being two of such segments independently operable which engage with pinions 63 and 64, conjoined to gears 55 and 56, respectively. The home position of the dial-hands, as well as the gears referred to, is determined by projections 65 and 66 on the gears which coöperate with yielding stops 67 and 68, mounted on laterally-movable plates 69 and 70, said plates being pivoted upon shaft 71.

72 indicates a frame carrying a bar 73, which bar passes through L-shaped openings 74 and 75 in the plates 69 and 70, respectively. This frame 72 and its carried bar 73, as well as the shaft 52, are mounted upon and movable with a frame which I will designate as a "casting" 76, said casting being provided with perforated lugs embracing the resetting-shaft 77.

78 represents a centering-plate mounted on the end of a spring-pressed bell-crank lever 79, which centering-plate engages and locks the wheels 50 and 51 when the casting 76 is moved upwardly upon the operation of the resetting-shaft. This centering-plate insures the meshing of gears 50 and 51 with the gears 46 and 47 when the resetting-shaft reaches home and the casting 76 occupies its normal position.

At the completion of a trip the conductor is supposed to operate the resetting-shaft to restore the mechanisms (with the exception of the totalizers) to a zero position. The recording mechanism is likewise operated from the resetting-shaft to make an impression on the conductor's and company's strips to indicate the condition of the register at the end of that trip. Furthermore, the trip-indicator is operated to exhibit "In," "Out," or "East," "West," &c., as the case may be.

In order to restore the dial-hands, it is obvious that the gearing from the actuating rock-arm 12 must be disengaged at some point to permit the restoring-segments 62 to operate. This break occurs between the gears 46 and 47, which are stationarily mounted, and the gears 50 and 51, which are movably mounted in the casting 76. As the casting 76 moves upwardly to effect this disengagement the gears 50 and 51 are locked against displacement by the centering-plate 78 and at the same time the bar 73 is moved opposite the lateral enlargements of the openings 74 and 75. Springs connected to the plates 69 and 70 move said plates to the right, so that the bar 73 is received in the lateral enlargements in said plates or either of them, and consequently the casting 76 cannot be returned to its normal or lowermost position as long as this condition exists. However, the projections 65 and 66 when the gears upon which they are mounted are released and returned engage the yielding projections 67 and 68 and move the plates 69 and 70, so as to register the vertical enlargements of the openings therein in alinement with the bar 73. The casting 76 may now be returned to its normal position; but if anything should happen to the restoring mechanism and the same is prevented from returning to its home position it is obvious that the casting 76 is locked in its upper position, and the register cannot be operated until the parts are released. The purpose of having the stops 67 and 68 yielding is to enable the gears 55 and 56 to make more than one revolution on a single trip. Consequently the capacity of the register is unlimited. The dial is marked to indicate one hundred fares, and the hands which travel over the dial are painted in different colors—say red and black—the red indicating the number of cash fares registered and the black indicating the number of tickets registered. If in any trip either hand makes a complete revolution, the limits of the register will not have been reached, the hands or either of them after passing zero continuing to register. In this connection I will state that if either of the restoring-segments 62 is moved so as to pass out of mesh with the teeth of its respective pinion the last tooth on the segment will simply ride over the teeth of the pinion as the pinion is rotated, the exhausted segment being at all times in position to return the hand connected to its pinion to a zero position irrespective of the point to which the hand may be moved or the position which the hand may occupy at the time the resetting-shaft is manipulated and these restoring-segments become effective.

The resetting-shaft above mentioned and which is indicated by the numeral 77 is mounted in suitable bearings provided on the base-casting, and in order to prevent a return movement of said shaft after the same has been initially moved to reset the register I arrange a ratchet 80 thereon, with which ratchet coöperates a pawl or yielding lock 81, insuring the rotating of the resetting-shaft in one direction only. The resetting-shaft also carries a cam 82, which coöperates with a roller 83 on the casting 76, whereby said casting is vibrated.

Figure 12:
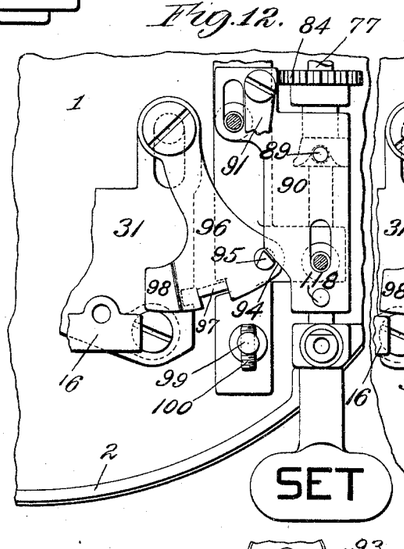
Fig. 12 is a detail elevational view of the resetting-rod and part of its associate mechanism.
Figure 13:
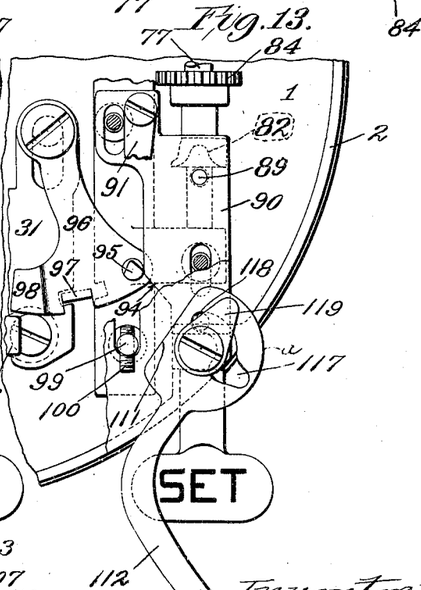
Fig. 13 is a similar view showing the parts in a different position.

84 indicates a pinion fixed to the resetting-shaft, which pinion meshes with a gear 85, said gear carrying a crank-pin 86, operating in a slot in the vertically-movable plate 87. This plate is appropriately guided in its movement and carries a trip-indicator 88, said indicator-plate having upon it words indicating the direction of the trip. The recording or printing mechanism is also operated from this resetting-shaft and the condition of the register indicated on the strips of paper at each operation of said shaft. This is effected through the cam 82, which cam, as shown more clearly in Figs. 12 and 13, coöperates with a roller 89, mounted upon the under side of a vertically-movable plate 90, provided with suitable slots through which pass fixed pins or shafts to guide it in its movement. This plate 90 has connected to it a pawl 91, held by a suitable spring in engagement with a ratchet 92, fixed to the shaft, upon which is mounted the positively-driven paper-feed roller 93. (See Fig. 11.) This plate 90 is also provided with a cam-face 94, which coöperates with a projection 95 on a rocking plate 96. Plate 96 always acts as a lock for some part of the register in whatever position it may be placed, and to accomplish this it is provided with a downward extension 97 and a lateral extension 98, the former, when the resetting-shaft is home, fitting in a notch in the casting 76 and preventing said casting from rising until after the plate 96 is swung laterally, (the casting 76 being released only after the resetting-shaft has made nearly half a revolution.) When the plate 96 is moved laterally and the casting 76 released, said projection 97 moves into engagement with a notch in the plate 31, and consequently locks the lever 15 against operation, and at the same time the lateral extension 98 moves in the path of the lever 16 and prevents said lever from being operated. Thus if the resetting-shaft is in other than a home position, no fares of any description can be registered in the machine nor can the machine be operated in any way except to complete the movement of the resetting-shaft and effect the operations resulting from such movement. I will also state here that the initial movement of the resetting-shaft operates the locking-plate 96 before the casting 76 is elevated, and the casting 76 is permitted to return home before the locking-plate 96 is finally released.

99 indicates a post carried by the lower end of casting 76, in the upper end of which post is arranged an adjustable abutment 100. In the path of travel of this abutment is located an arm 101, extending from a rocking post 102, the inner face of which is flat, (see Figs. 5 and 11,) so that when said post is rocked a platen-plate 103, loosely arranged in proximity to the flat face of said post, will be forced toward the printing-totalizers, and, as the strips of paper are between said platen-plate and the printing-totalizers, an impression will be made. In order that a single impression may be made on both strips of paper, the company's strip is preferably of thin paper, while the conductor's strip is comparatively thick. The thin company's strip is nearest the printing-type, and the impression is simultaneously made thereon by the printing-type and upon the conductor's strip. To prevent displacement of the platen-plate, I prefer to hinge the same at one end—the left end. (Shown in Fig. 5.)

A guide 104 is preferably used for conducting the company's strip to the printing-wheels, said guide preventing the strip from contacting with moving parts of the machine.

A spring 105 is connected to the platen 103 for the purpose of holding the same against the flat face of the post 102.

106 indicates a rocking frame carrying an idle roller 107 on its free end, which roller in the normal operation of the machine (see Fig.

11) serves to back the positive feed-roller 93. This roller is yieldingly held in its normal position by means of a spring 108. (See Figs. 5 and 10.) An extension 109 is arranged on the free end of this rocking frame, said extension carrying a projection or roller 110 on its lower end, which is designed to coöperate with a cam 111, which is provided with an operating-handle 112, extending to the exterior. This cam 111 controls the introduction and removal of the conductor's strip, and the presence or absence of the conductor's strip renders the register operative or inoperative.

In order to insert or remove the conductor's strip, the cam 111 must be operated, and this operation causes an impression to be made. If there is no conductor's strip in the machine and one is inserted, the cam 111 must be in what I will term "an open position" to permit of the introduction of said strip. When the strip is introduced, the machine cannot be operated until the cam is moved to what I will term "a closed position," and in being moved to this closed position an impression is made on the company's and conductor's strips indicating the condition of the register at this time. This "compulsory impression," as I will term it, is independent of the resetting-shaft.

I have in the above referred to the presence of the conductor's strip as being necessary to enable the register to be operated. This is effected by the manipulation of a locking device controlled by the conductor's strip, said locking device being effective when the strip is absent, so that the rocking cams 14 cannot be manipulated; but when the conductor's strip is present said cam-lock is released.

Figure 5:
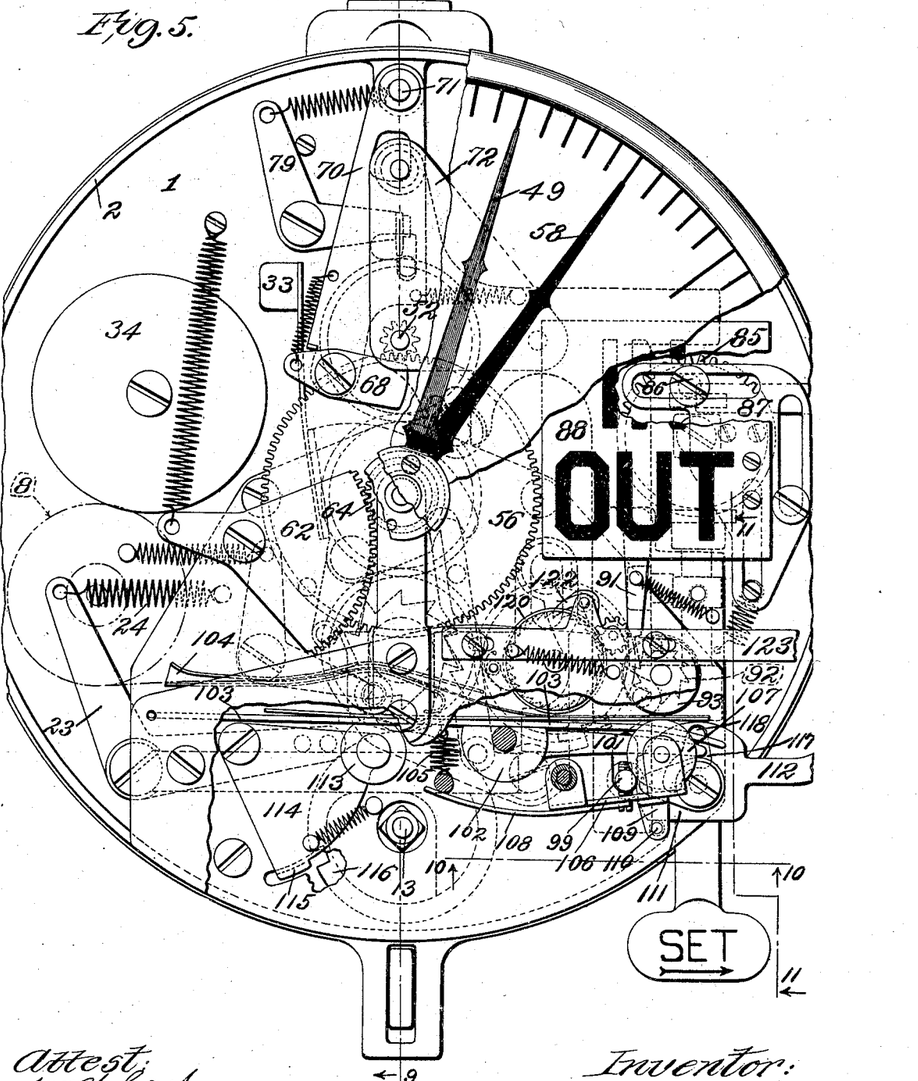
Fig. 5 is a plan view, on a larger scale, of my improved register, a portion of the dial being broken away to more clearly show the interior mechanism.

Referring now to Fig. 5, 113 indicates a roller which protrudes through an opening in the platen-plate 103. This roller is mounted upon one end of a swinging plate 114, a spring being connected to said plate, so that when the conductor's strip is absent the roller will be permitted to protrude through the opening and the plate 114 will consequently be rocked, such rocking of the plate causing a projection 115 carried thereby to engage in a notch in a disk 116, fixedly secured to the cam-block 14. (See Fig. 9.) However, when the conductor's strip is inserted the handle 112 must be depressed to throw its connected cam to an open position, when the conductor's strip may be inserted, and said conductor's strip must be introduced a sufficient distance into the machine to engage the wheel 113 and move the plate 114, so as to disengage its projection from the notch in disk 116. When the cam 111 is closed, it is obvious that the backing-roller 107 is in contact with the feed-roller 93 and that any attempt to introduce the conductor's strip between said rollers would be ineffectual, because the feed-roller 93 would be locked against such backward rotation by the pawl 91. Furthermore, the feed-roller 93 is provided with a milled periphery, which will prevent the slipping of the conductor's strip over its surface when the backing-roller 107 is in engagement therewith. Cam 111 is provided with an opening 117, through which passes a pin 118 on the plate 90. One end of this opening 117 is formed with a radial enlargement, which when the cam is closed receives the pin 118, permitting the resetting-shaft to be operated and the plate 90 to be vibrated only when the cam is closed. If the cam is in other than a full-closed position, the pin 118 will be located in the contracted portion of the opening 117 and the plate 90 will be moved down, the plate 96 rocked laterally, so as to lock the levers 15 and 16 against operation, the handle 112 will be located over the winged handhold of the resetting-shaft, preventing the same from being turned, and the resetting-shaft cannot be operated. 119 indicates a portion of this cam 111, which is shown in the drawings as a separate piece fixed to the upper face of said cam 111. This cam-face 119 coöperates with the arm 101 in the impression-making post 102, said cam projection 119 passing the end of said arm in the opening and closing movements of the cam 111.

From the above it will be observed that my improved register is capable of registering and indicating two classes of fares, said registering and indicating mechanisms being independently operable. So far as I am aware I am the first to arrange two indicating-hands of different color to indicate different classes of fares, said indicating-hands traveling over the same dial. So far as the registering mechanisms are concerned while they are independently operable they have common features and are treated collectively in several of the operations of my improved register. They are both operated from a common source, one of said registering mechanisms sounding an audible signal while the other does not sound any signal. Both registering mechanisms have independent accumulating devices, but the impression-taking mechanism is common to both accumulators. The resetting-shaft operates to release both indicating mechanisms; but independent means are provided for their restoration to a zero position. The resetting-shaft sets in operation the impression-taking device common to both accumulators and also releases a locking device common to both indicators and sets in operation locking devices individual to the registering mechanisms.

The manner in which the printing operation is effected by the reciprocation of the frame 76, resulting from an operation of the resetting-shaft, is shown in Figs. 5 and 10, wherein it will be observed that post 99 on the reciprocating frame 76 has its adjustable contact-bolt 100 in alinement with the arm 101, which operates the platen-plate 103. Thus upon the rotation of the resetting-shaft frame 76 is forced upwardly, and in such movement the bolt 100 contacts with the arm 101 and forces the platen-plate to make a printing impression.

Figure 14:
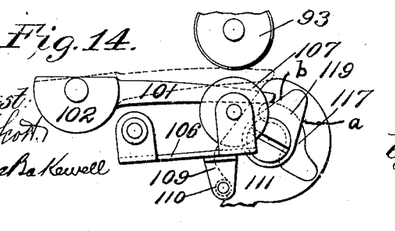
Fig. 14 is a detail view illustrating the manner of operating the compulsory impression mechanism.

In starting the machine the company's strip is threaded through the guide 104 past the accumulator and into its way between the casing and the guard-strip 11. This strip is inaccessible to the conductor or to any person other than one having a key to release the panels 6 and 10. In inserting his strip the conductor must open the cam 111, and while said cam is open no fare can be registered in the machine, nor can the resetting-shaft be operated. When the conductor's strip is in proper position the registering mechanism will be released, and when the cam 111 is closed the impression-making devices will be operated to indicate on the company's strip and on the conductor's strip the condition of the register at the time the conductor's strip is inserted. The closing of the cam not only releases the resetting-shaft, but also releases the registering mechanism, so that fares can be registered in the machine. Before the conductor's strip can be removed the cam 111 must be manipulated and the condition of the register impressed on the strip immediately before its removal. This is accomplished by means of the face $a$ of cam 119, which face, as shown in Fig. 5, is in readiness when the handle 112 is moved downwardly to force the arm 101 up to compel a printing impression. The highest part of cam 119 passes the end of arm 101 in the downward movement of the handle 112, and when said handle is in its lowermost position arm 101 stands released and the channel for the conductor's strip is open. (See Fig. 14.) The conductor's strip may now be removed and another strip inserted. Before the machine can be operated the handle 112 must be raised, as above described, in which event face $b$ of cam 119 will raise the arm 101 and compel a printing impression during the movement of this cam to its home position. When in its home or normal position, as shown in Fig. 5, the point of cam 119 is away from arm 101, and said arm relieves the platen-plate 103 from pressure and permits the company's strip and the conductor's strip to be fed freely in unison when the feeding devices are set in operation either by rotating the resetting-shaft or by depressing the handle 112 of the compulsory-printing device, as hereinbefore described.

In order to print the date on the strips of paper used in the machine, I arrange a date-wheel 120, having an axis of rotation common to the accumulating-wheels. This date-wheel (see Fig. 11) has conjoined to it a ratchet-wheel 121, with which coöperates a pawl 122 on an arm 123. This arm (see Fig. 5) extends in proximity to the casing of the machine and is accessible only to the company's representative having a key which will release the panel 10. When the company's strip is removed at night, the arm 123 is vibrated to set the date for the next day.

To illustrate the printing on the two strips, we will suppose that the following appears on the conductor's strip which has just been removed:

| Date. | | Tickets. | | Cash Fares. |
|---|---|---|---|---|
| 28 | — | 150 | : | 225 |
| 28 | — | 140 | : | 220 |
| 28 | — | 125 | : | 200 |
| 28 | — | 100 | : | 175 |

The last figures in the above indicate the condition of the register at the time the strip was inserted, and the upper figures indicate the condition of the register at the time the strip was removed. If another strip is inserted, before the register can be operated a compulsory impression will be made on said strip as follows:

$$28 \quad - \quad 150 \quad : \quad 225$$

This indicates the condition of the register at the time the new strip is placed in position, and after the strip is in place whenever the resetting-shaft is operated the condition of the register will be impressed upon the strips.

I am aware that many minor changes in the construction, arrangement, and combination of the several parts of my machine can be made and substituted for those herein shown and described without in the least departing from the nature and principle of my invention.

Having thus described my invention, what I claim, and desire to secure by Letters Patent, is—

1. The combination with totalizers for registering different classes of fares, of a separate and independent ratchet for each totalizer, a separately-operable and independent pawl for each of said ratchets, oppositely-disposed cam-faces, and independently-operable parallel levers connected with said pawls and separately operated by said cam-faces; substantially as described.

2. The combination with totalizers for registering different classes of fares, of a separately-operable and independent ratchet for each totalizer, a separately-operable and independent pawl for each of said ratchets, means for rocking each of said pawls, and a single spring for holding both of said pawls in engagement with their respective ratchets; substantially as described.

3. The combination with totalizers, of ratchets therefor, both of which are independently movable with relation to each other, a pawl for each ratchet, a double cam for operating each of said pawls independently, parallel levers operable by said cam and carrying said pawls, means for positively holding one of said pawls in engagement with its ratchet in one movement, and a spring common to both of said pawls, said spring holding the other of said pawls in yielding engagement with its ratchet; substantially as described.

4. In a fare-register, the combination with totalizers for different classes of fares, independently-movable levers carrying pawls at their ends for driving said totalizers independently of each other, and a cam movable in opposite directions to operate said levers and their carried pawls, said cam having working faces of different radii so as to move the said levers and their carried pawls the same distance when the cam is rocked in either direction; substantially as described.

5. In a fare-register, the combination with totalizers and actuating means therefor, of a plurality of parallel separately and independently operable levers connected with said actuating means, a common supporting-pivot for said levers, a rockable cam with a plurality of oppositely-disposed cam-faces coöperating with said levers, and a means common to both of said levers for restoring them to normal position; substantially as described.

6. In a fare-register, the combination with pawl-carrying levers having a common pivotal point and means for moving same independently, of a plate connected to one of said levers, and a rocking frame carrying a bell-hammer, which frame coöperates with said plate and with a ratchet-wheel driven by the pawl connected to the plate; substantially as described.

7. In a fare-register, the combination with registering mechanism, of a ratchet-wheel, a rack for operating the same, a plate in which said rack is pivotally mounted, an arm for moving said plate, and a rockable bell-hammer coöperating with said plate and with said ratchet-wheel; substantially as described.

8. In a fare-register, the combination with registering mechanism, of a bell-hammer, and independently-operable means for recovering said bell-hammer after the registration of a fare; substantially as described.

9. In a fare-register, the combination with two registering mechanisms, of a bell-hammer, means operated by one of said registering mechanisms for tripping said bell-hammer and permitting it to move to an abnormal position to strike the bell, and means independent thereof for recovering said bell-hammer when the said registering mechanism is in a normal position; substantially as described.

10. In a fare-register, the combination with registering mechanisms, of means for operating each of said mechanisms independently of the other, a bell-hammer operated by one of said mechanisms only, and means for causing said bell-hammer to move to an abnormal position to strike the bell; substantially as described.

11. In a fare-register, the combination with a registering mechanism, of a ratchet-wheel for driving the same, a movable plate to which is pivotally connected a rack for operating said ratchet-wheel, a rocking plate carrying a bell-hammer, said rocking plate having a shoulder designed to ride over the teeth of the ratchet-wheel, and a projection on said rocking plate for coöperating with a cam-face on the movable plate, whereby, when said plate is in its home position, the bell-hammer is recovered; substantially as described.

12. In a fare-register the combination with registering mechanism, of a ratchet-wheel for driving the same, a rack 17 coöperating with said ratchet-wheel, a plate 31 movable with said rack, said plate having cam-face 38, and a rocking plate 32 carrying a bell-hammer, said rocking plate having a shouldered end piece 36 and a projection 37, the former coöperating with the teeth of the driving-ratchet, and the latter coöperating with the cam-face 38; substantially as described.

13. In a fare-register, the combination with registering mechanisms, of ratchets each of which is movable independently of the other for driving the same, independently-movable racks coöperating with said ratchets, means for operating said racks, a spring connected to one of said racks for holding the same against its ratchet-wheel, and a projection on said spring-pressed rack engaging the other of said racks to hold it against its respective ratchet-wheel; substantially as described.

14. In a fare-register, the combination with registering mechanisms, of ratchets for driving the same, means for moving said ratchets step by step independently of each other, which driving means includes two racks, a pin 29 on one of said racks engaging the other of said racks, and a spring for holding the rack which carries the pin against its ratchet; substantially as described.

15. In a fare-register, the combination with registering mechanism, of a driving-ratchet therefor, a plate which is rocked when said ratchet is actuated, a pawl for operating said ratchet, a dog in the path of movement of said pawl, and means on the rocking plate for displacing the dog upon the initial movement of the operating-pawl; substantially as described.

16. In a fare-register, the combination with registering mechanism, of a ratchet-wheel for driving the same, a pawl for operating said ratchet-wheel step by step, a dog in the path of movement of said pawl, and means operated by the ratchet-wheel for displacing the dog upon the initial movement of said wheel; substantially as described.

17. In a fare-register, the combination with registering mechanism, of a driving-ratchet therefor, a pawl for operating said ratchet, a bell-ringing mechanism comprising a rocking plate, and means operated by the rocking plate for preventing the actuation of the pawl after the bell has been rung and before said pawl is permitted to return to its home position; substantially as described.

18. In a fare-register, the combination with a registering mechanism, of a driving-ratchet therefor, a pawl for operating said ratchet, a rocking plate carrying a bell-hammer, which is actuated by said ratchet, and a lock in the path of the pawl which is operated by said rocking plate upon the initial movement of the ratchet, whereby said lock is displaced laterally, said lock becoming operative after the bell is rung; substantially as described.

19. In a fare-register, the combination with registering mechanism, of a driving-ratchet therefor, a pawl for operating said ratchet, a dog normally in the path of said pawl, and a bell-ringing mechanism operated by said ratchet for displacing said dog and ringing the bell, said mechanism, after the bell is rung, permitting the dog to coöperate with the operating-pawl in such manner as to enforce the restoration of said operating-pawl to a home position before another fare can be registered; substantially as described.

20. In a fare-register, the combination with registering mechanism, of a driving-ratchet therefor, a pawl for operating said ratchet step by step, a projection on said pawl, a dog normally in the path of said projection, a rocking plate operated by the ratchet, a bell-hammer carried by said rocking plate, and a projection on said rocking plate for laterally displacing the dog upon the initial movement of the ratchet; substantially as described.

21. In a fare-register, the combination with registering mechanisms, means for operating same independently, a dial, indicating-hands operated by the registering mechanisms, respectively, for indicating the number of fares registered on said dial, means for disengaging the registering mechanisms from the indicating-hands, devices for restoring said hands to a zero position when so out of engagement with the registering mechanisms, and a centering-bar for insuring the proper reëngagement of said parts; substantially as described.

22. In a fare-register, the combination with independently-registering mechanisms for registering cash-fare and transfers separately, of independent index-hands identified with said mechanisms respectively, said hands indicating the number of fares registered on each trip in each mechanism, a resetting-shaft for disengaging both of said hands from their respective mechanisms, and means operated by said resetting-shaft for taking an impression from both of said registering mechanisms; substantially as described.

23. In a fare-register, an indicating means, a registering mechanism, type for recording the condition of the register upon strips of paper superposed one upon the other, means for resetting the indicator and recording the condition of the register upon said strips of paper, and means operable independently of said resetting mechanism for recording the condition of the register upon said strips just after one of them has been inserted into, or just previous to the removal of said strip from, the machine; substantially as described.

24. In a fare-register, an indicating means, a registering mechanism, type for recording the condition of the register upon two strips of paper superposed one upon the other, one of said strips being the company strip and being contained wholly within the machine and the other of said strips being the conductor strip and being removable, means for resetting the indicator and recording the condition of the register upon both of said strips of paper, means operable independently of said resetting mechanism for recording the condition of the register upon said strips just after the insertion of the conductor strip, and a lock for preventing the register from being operated until such record is made upon the strips; substantially as described.

25. In a fare-register, an indicating means, a registering mechanism, type for recording the condition of the register upon two strips of paper superposed one upon the other, one of said strips being the company strip and contained wholly within the machine, and the other of said strips being a conductor's strip and removable from the machine, means for resetting the indicator and recording the condition of the register upon said strips of paper, means operable independently of said resetting mechanism for recording the condition of the register upon said strips just after the conductor's strip is inserted into the machine, a lock for preventing the register from being operated until the record is made upon both strips after the conductor's strip is inserted into the machine, and means for gripping the conductor's strip after its insertion to prevent its removal until said independently-operable impression device is operated to record the condition of the register upon said strip previous to the release of the conductor's strip by said gripping devices, said gripping devices being operable by said independently-operable impression means; substantially as described.

26. In a fare-register, an indicating means, printing-wheels, a resetting-shaft and connected mechanism for resetting said indicating means and causing a compulsory recording, and an independently-operable compulsory-recording means adapted to grip the conductor's strip after the same is inserted in the machine and make an impression thereon; substantially as described.

27. In a fare-register, an indicating means, printing-wheels, a resetting-shaft, and connected mechanism for resetting said indicating means, and causing a compulsory recording, and an independently-operable compulsory-recording means adapted to grip the conductor's strip after the same is inserted in the machine and make an impression thereon, and means for preventing the operation of the register while the compulsory-impression mechanism is in other than a home position; substantially as described.

28. In a fare-register, the combination with printing-wheels, of means for taking an impression therefrom, a resetting-shaft for operating said impression devices, and a compulsory-impression mechanism which is operated independently of the resetting-shaft to cause the impression mechanism to operate upon the removal of a strip of paper from, or the insertion of a strip of paper into, position opposite said printing-wheels; substantially as described.

29. In a fare-register, the combination with registering and recording mechanisms in the form of independently-operable banks of printing-wheels, of index-hands common to each mechanism, an impression device, a resetting-shaft for permitting the index-hands to be returned to zero position and for simultaneously operating the impression device, and a compulsory-impression mechanism operable independently of the resetting-shaft for taking an impression from the printing-wheels before a strip of paper is removed from the machine and after a strip of paper is inserted into position in the machine, said compulsory-impression device locking the other mechanism against operation while in other than a home position; substantially as described.

30. In a fare-register, the combination with two independently-operable banks of printing-wheels which are adapted to register and record different classes of fares, of indicating devices common to said registering and recording mechanisms, a resetting-shaft for operating an impression mechanism whereby the condition of said registering and recording mechanisms is impressed on a strip of paper, means for rendering said registering mechanism inoperative in the absence of said strip of paper from the machine, means for feeding said strip of paper upon the operation of said resetting-shaft, and means for impressing the condition of said banks of printing-wheels upon said strip of paper independently of said resetting-shaft; substantially as described.

31. In a fare-register, the combination with printing-wheels adapted to be actuated at the registration of each fare, of a continuous strip of paper contained within the machine and a removable strip of paper accessible at all times from the exterior, said printing-wheels making an impression through the continuous strip onto the removable strip, indicating devices connected to and operated by the mechanism which operates the printing-wheels, whereby the fares registered are indicated on the face of the register, a resetting-shaft for disengaging said indicating devices from the printing-wheels and permitting the restoration of said indicating devices to a zero position, said resetting-shaft locking the printing-wheels against actuation when in other than a home position, means operated by said resetting-shaft for making an impression on said strips of paper, and a compulsory-impression mechanism capable of being operated when the resetting-shaft is in its home position; substantially as described.

32. In a fare-register, the combination with a resetting-shaft, of a paper-feed roller, means operated by said resetting-shaft for driving said paper-feed roller, and mechanism independent of said resetting-shaft for operating said paper-feed roller; substantially as described.

33. In a fare-register, the combination with a paper-feed roller, of a resetting-shaft for operating same, mechanism independent of said resetting-shaft for operating said roller, and an idle backing-roller which is thrown into an inoperative position when said last-mentioned mechanism is operated; substantially as described.

34. In a fare-register, the combination with a resetting-shaft, of a slidable plate operated thereby, a paper-feed roller, a pawl on said plate for operating said roller, an impression mechanism operated by said resetting-shaft, and means independent of said resetting-shaft for operating said paper-feed roller and said impression mechanism; substantially as described.

35. In a fare-register, the combination with a resetting-shaft, of a compulsory-impression mechanism operable independently of said shaft, and which, in other than a home position, prevents said resetting-shaft from being operated; substantially as described.

36. In a fare-register, the combination with a resetting-shaft, of a vibrating plate designed to be operated thereby, a paper-feed roller operated by a pawl carried by said plate, an impression mechanism operated by said resetting-shaft, and a compulsory-impression cam for vibrating said plate and operating the impression mechanism independently of the resetting-shaft; substantially as described.

37. In a fare-register, the combination with a vibrating plate 90, of a plate 96 operated therefrom, a resetting-shaft for operating said vibrating plate, and a compulsory-impression cam capable of operating said vibrating plate; substantially as described.

38. In a fare-register, the combination with a platen-plate, of a resetting-shaft for operating the same, and a compulsory-impression cam capable of operating said plate independently of the resetting-shaft; substantially as described.

39. In a fare-register, the combination with a spring-pressed roller 107 designed to coöperate with a strip of paper, of a cam 111 for throwing said roller out of engagement with said paper; substantially as described.

40. In a fare-register, the combination with a vibrating casting 76 carrying an adjustable abutment 100, of a resetting-shaft for vibrating said casting, and a platen-plate operated from said adjustable abutment; substantially as described.

41. In a fare-register, the combination with a vibrating casting 76, of a resetting-shaft for operating the same, an adjustable abutment carried by said casting, a flat-faced post having an arm in the path of said adjustable abutment, and a platen operated by said post; substantially as described.

42. In a fare-register, the combination with a platen, of a flat-faced post for operating the same, an arm on said post, and a cam traveling past the end of said arm, whereby said arm is operated by the movement of said cam in either direction; substantially as described.

43. In a fare-register, the combination with a cam 111 provided with a slot 117 and a projection 119, of paper-feeding mechanism, an idle paper-roller, and a printing mechanism operated by the above-mentioned parts of said cam; substantially as described.

44. In a fare-register, the combination with a casing whose overlapping ends are provided with guiding-tongues $3^c$ and $3^d$, said casing being formed with an opening $3^b$, of a hinged panel provided with a tongue for guiding the paper passing outwardly through the casing through said tongues back in the casing through the opening $3^b$; substantially as described.

45. In a fare-register, the combination with a casing, of a guard-strip 11 forming a paper-guide; substantially as described.

46. In a fare-register, the combination with a casing, of a guard-strip 11 forming a paper-guide, and a hinged panel for directing the paper into said guideway so formed; substantially as described.

47. In a fare-register, the combination with a casing, of a guard-strip forming a guideway for a strip of paper, and a hinged panel provided with a tongue for directing the end of the strip of paper into the guideway; substantially as described.

48. In a fare-register, the combination with a casing formed with openings $3^a$ and $3^b$, the overlapping ends of said casing having tongues $3^c$ and $3^d$, of a hinged panel 6 carrying a spool for a roll of paper which projects through the opening $3^a$, a hinged panel 10 provided with an opening $10^a$ and tongue $10^b$, said tongue projecting through the opening $3^b$ of the casing when the hinged panel is in a closed position, and a guard-strip 11 forming a guideway for a strip of paper; substantially as described.

49. In a fare-register, the combination with a dial-plate, of hands traveling thereover and having some distinguishing characteristic whereby they indicate different classes of fares registered, registering and recording mechanisms connected to each hand, means for operating said mechanisms independently, a resetting-shaft for restoring the hands to zero position and causing the recording devices to impress the condition of the register upon a strip of paper, and an independently-operable compulsory-impression device in the path of means on the resetting-shaft, said impression device being operated whenever a strip of paper is inserted into, or removed from the machine; substantially as described.

50. In a fare-register, the combination with a resetting-shaft having a handle by which the same may be operated, of a compulsory-impression device, and a handle on said compulsory-impression device which is designed to occupy a position in the path of the handle of the resetting-shaft when said compulsory-impression device is operated; substantially as described.

51. In a fare-register, the combination with registering mechanisms and its driving-ratchet, of a pawl for operating said ratchet, and a pivoted plate which is actuated when the ratchet-wheel is turned, said plate locking the pawl in engagement therewith; substantially as described.

52. In a fare-register, the combination with registering mechanism, of a ratchet therefor, a pawl for actuating said ratchet, a pivoted plate carrying a bell-hammer, said plate being notched to coöperate with a projection on the pawl and hold the same in engagement with its ratchet, and means on said plate for coöperating with the ratchet-wheel; substantially as described.

53. In a fare-register, the combination with registering mechanism and its driving-ratchet, of a pawl for operating said ratchet, said pawl being provided with a projection 29, of a rocking plate 32 which is operated by the ratchet-wheel, said rocking plate having a recess for receiving the projection 29, and means for tripping said plate so as to cause its disengagement from the pawl projection after the pawl has completed its stroke and operated the ratchet-wheel; substantially as described.

54. In a fare-register, the combination with recording mechanisms, of a dating-wheel, and means for operating said dating-wheel, said means being located in the interior of the casing and inaccessible except to an authorized person; substantially as described.

55. In a fare-register, the combination with recording and printing mechanisms, of a dating-wheel, a ratchet conjoined to said dating-wheel, and a vibrating rod carrying a pawl in engagement with said ratchet, said rod terminating within the casing of the machine; substantially as described.

56. In a fare-register, the combination with a casing, of panels hinged thereto, recording mechanism, a dating-wheel, and means for operating said dating-wheel, access to said means being controlled by said hinged panels; substantially as described.

In testimony whereof I hereunto affix my signature, in the presence of two witnesses, this 19th day of November, 1901.

WILLIAM G. KIRCHHOFF.

Witnesses:
GEORGE BAKEWELL,
RALPH KABSH.